United States Patent

[11] 3,617,811

[72] Inventor David S. McVoy
Gainesville, Fla.

[21] Appl. No. 57,182

[22] Filed July 22, 1970

[45] Patented Nov. 2, 1971

[73] Assignee Coaxial Scientific Corporation
Alachua, Fla.

[54] CABLE TELEVISION TAPOFF UNIT
7 Claims, 7 Drawing Figs.

[52] U.S. Cl. .......... 317/99, 174/59, 333/9

[51] Int. Cl. .......... H01p 5/14, H03h 7/48

[50] Field of Search .......... 174/51, 52 R, 59, 70 R, 71 R, 71 C, 72 R; 317/99, 101 R; 325/308, 355, 356; 333/6, 8, 9, 10

[56] References Cited

UNITED STATES PATENTS

| | | | |
|---|---|---|---|
| 3,176,230 | 3/1965 | Collins .......... | 174/71 C X |
| 3,359,460 | 12/1967 | Ragone et al. .......... | 317/99 |
| 3,440,329 | 4/1969 | Winston .......... | 174/52 R |
| 3,486,135 | 12/1969 | Sweeney .......... | 333/9 |
| 3,500,253 | 3/1970 | Oprysko .......... | 333/9 |
| 3,537,036 | 10/1970 | Winegard et al. .......... | 333/10 |

*Primary Examiner*—Laramie E. Askin
*Attorney*—Olson, Trexler, Wolters & Bushnell

ABSTRACT: A cable television tapoff unit comprises a housing into which coaxial cables are connected and which is used with modularized circuit boards which are of similar physical configuration and are interchangeably mounted in the housing so that a given housing may be used as or converted to a line splitter, directional coupler, housedrop, etc. The circuit boards contain all of the circuitry for the unit and the housing is free of integrally wired-in components.

Inventor
David S. McVoy
By: Olson, Trexler, Wolters & Bushnell
attys

Inventor
David S. McVoy
By: Olson, Trexler, Wolters & Bushnell
Attys.

CABLE TELEVISION TAPOFF UNIT

This invention relates to an improved tapoff unit for coaxial cable television systems.

It is an object of this invention to provide a cable television tapoff unit which utilizes a housing that can be standardized to receive coaxial cables and which is also adapted to receive any one of a number of different modules which are wired with different circuit components so that the same housing can be used with different modules to produce directional couplers, line splitters, housedrop tapoffs, and the like.

It is a further object of this invention to provide a tapoff unit of the type stated in which the housing has connectors for receiving the coaxial cables, but does not include any integral or "wired-in" components. All of the components used for the interconnecting circuitry between the coaxial cables are located on the modules or circuit boards. These circuit boards are readily interchangeable. Also the inner coaxial conductor of each cable is seized by a connector on the board for electrical connection with the circuitry. The circuit board preferably also includes a grounding plug for reception in a grounding jack on the housing to provide the ground connection through to the outer coaxial cable conductors.

It is another object of this invention to provide a tapoff unit of the type stated which permits replacement of the circuit boards, the testing of RF and powering signals, and other uses without disrupting service on the trunk line and without the necessity of disconnecting the coaxial cables. The ability to make changes in the function of the tapoff unit as by replacing circuit modules, converting from single to multiple housedrop, etc., without removing the cables or otherwise disassembling the housing, is of considerable importance and can greatly facilitate servicing, modifying or updating the cable system. As aforesaid, this advantage is brought about in large measure by having all of the circuitry on the circuit boards or modules and none of the circuitry integrally wired into the housing. Consequently, once the housing and cables are installed, they can be left alone except in the rare instance where there is physical damage to the housing proper.

It is a still further object of this invention to provide a tapoff unit of the type stated which can be adapted for use with all present sizes of standard coaxial cables now used in the cable television industry.

It is another object of this invention to provide a tapoff unit of the type stated in which the circuit boards or modules can be stacked within the housing, thereby further to enhance the flexibility of the unit.

In cable television systems, powering voltages are passed to the cable for powering amplifiers in the system. In accordance with the present invention the powering ability can be made extremely selective so as to pass power beyond the tapoff or through a tap leg, or both. All of the powering components are wired into the circuit modules and none is wired integrally into the housing.

The attainment of the above and further objects of the present invention will be apparent from the following detailed description taken in conjunction with the accompanying drawing forming a part thereof.

In the drawing, FIG. 1 is a partial sectional view of a tapoff unit constructed in accordance with and embodying the present invention;

FIGS. 2 and 3 are sectional views taken along lines 2—2 and 3—3 respectively of FIG. 1;

Figures 1, 2, 3, 4:
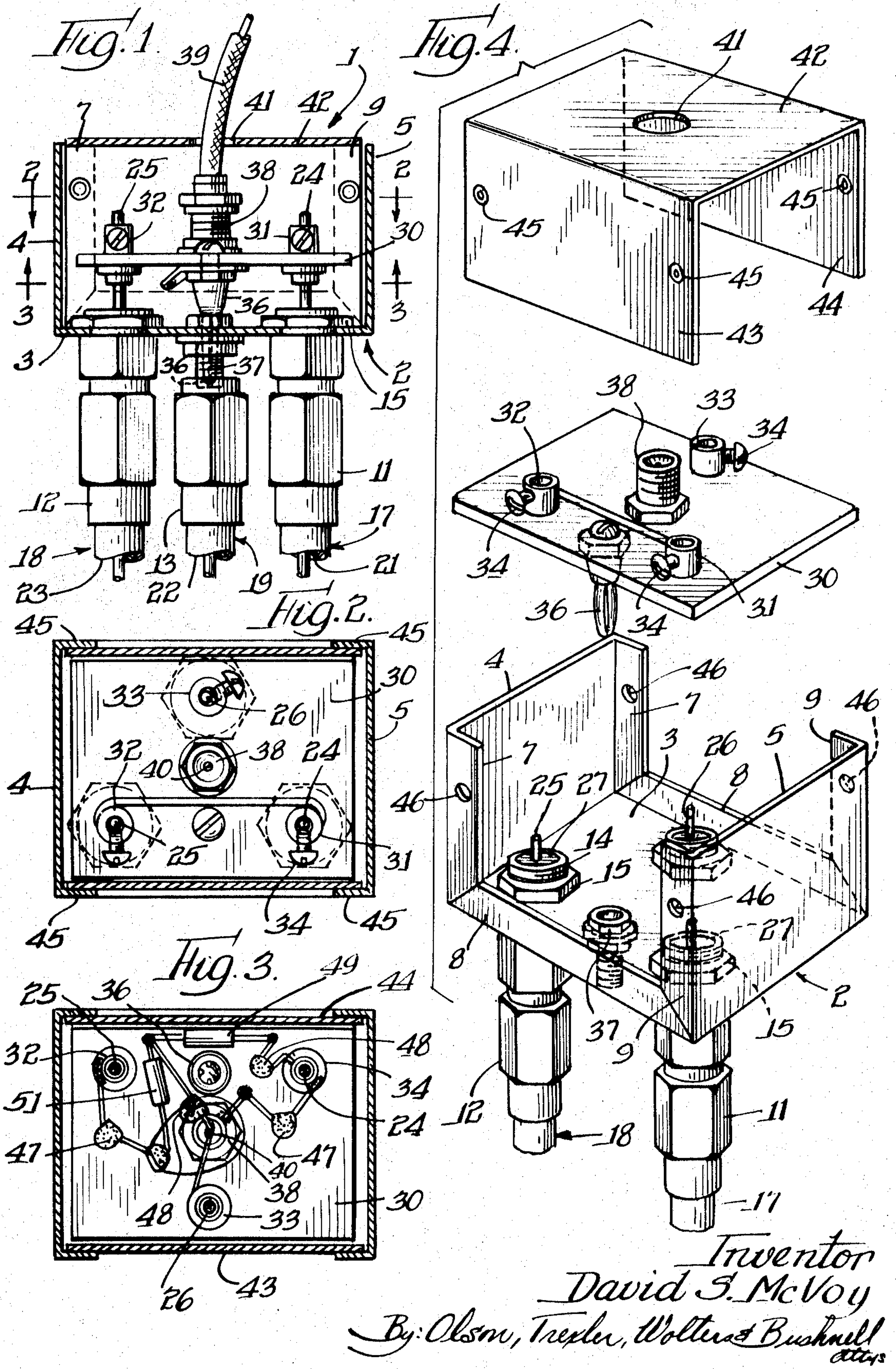
FIG. 4 is an exploded perspective view of the tapoff unit with portions of the circuitry on the circuit module being omitted for the sake of clarity.

Referring now in more detail to the drawing, 1 designates a tapoff unit that comprises a housing 2 having a base 3 and upstanding sides 4, 5. The housing 2 may be fabricated of a single piece of sheet metal which is folded to form the sides 4, 5 together with inwardly extending flanges 7, 8, 9 on the base 3 and sides 4, 5 respectively.

The base 3 is punched for receiving coaxial connectors 11, 12, 13 of conventional construction. Thus, each connector has a threaded portion 14 which projects through the base 3, the connector being retained on the base 3 by a nut 15 which engages the thread portion 14. The connectors 11, 12, 13 receive coaxial cables 17, 18, 19 such that the outer coaxial conductors 21, 22, 23 are grounded through the connectors to the housing 2 while the inner coaxial conductors 24, 25, 26 are insulated from the housing by tubular insulating portions 27 of the respective connectors. In the embodiment of the invention shown in FIGS. 1–4, there are three parallel coaxial connectors and cables, for instance an input cable 17, an output cable 18, and a tap leg cable 19. When a tap leg cable 19 is not required, the connector for the same may be left on the housing or, alternatively, it may be removed from the housing. Furthermore, the housing may, in this instance, not be prepunched for a tap leg.

Provided for removable disposition within the housing 2 is a circuit board 30 of dielectric material. The circuit board 30 contains parallel tubular sleeves or connectors 31, 32, 33 for receiving the respective center conductors 24, 25, 26 of the coaxial cables 17, 18, 19. For this purpose the outer conductor and cable insulation for each cable are cut away to allow the center conductor to project into the housing 2 a sufficient distance to extend through and beyond the associated connector 31, 32, 33. Each connector 31, 32, 33 has a setscrew 34 for clamping the inner conductor to the connector. The circuit board 30 also contains an elongated or so-called "banana" plug 36 that extends generally parallel to the bore openings of the connectors 31, 32, 33. The plug 36, when assembled with the housing, telescopes snugly into a grounding jack 37 on the housing base 3.

From the foregoing it will be seen that the circuit board 30 may be readily installed in the housing 2 by simply aligning the center conductors 24, 25, 26 with the respective connectors 31, 32, 33, which also aligns the plug 36 with the jack 37, and then plugging the plug 36 into the jack 37. Thereafter the setscrews 34 may be tightened against the inner conductors 24, 25, 26.

In the particular circuit board herein illustrated, there is provided centrally thereof a conventional coaxial connector 38, for example a type F 61. The connector 38 is used where the circuit board 30 includes circuitry for a housedrop, in which case a housedrop coaxial cable 39 is secured in a conventional manner to a connector 38 and runs to a subscriber's television set. The center conductor 40 of the connector 38 is wired into the circuit on the board 30 in a conventional manner. The housedrop cable 39 extends through a hole 41 in the top of a cover 42 for the housing. The cover 42 is a U-shaped sheet metal piece having sides 43, 44 that fit flush against and inside of the flanges 7, 8, 9. The metals of the housing and of the cover are resilient, and the cover has on its sides 43, 44, outwardly struck detents 45 which seat in holes 46 on the flanges 7, 9 when the cover and base are assembled. Where the circuit board 30 is not intended to serve a housedrop, the connector 38 may be either eliminated or simply not used, and the cover 42 may be devoid of the hole 41.

Figures 5, 6, 7:
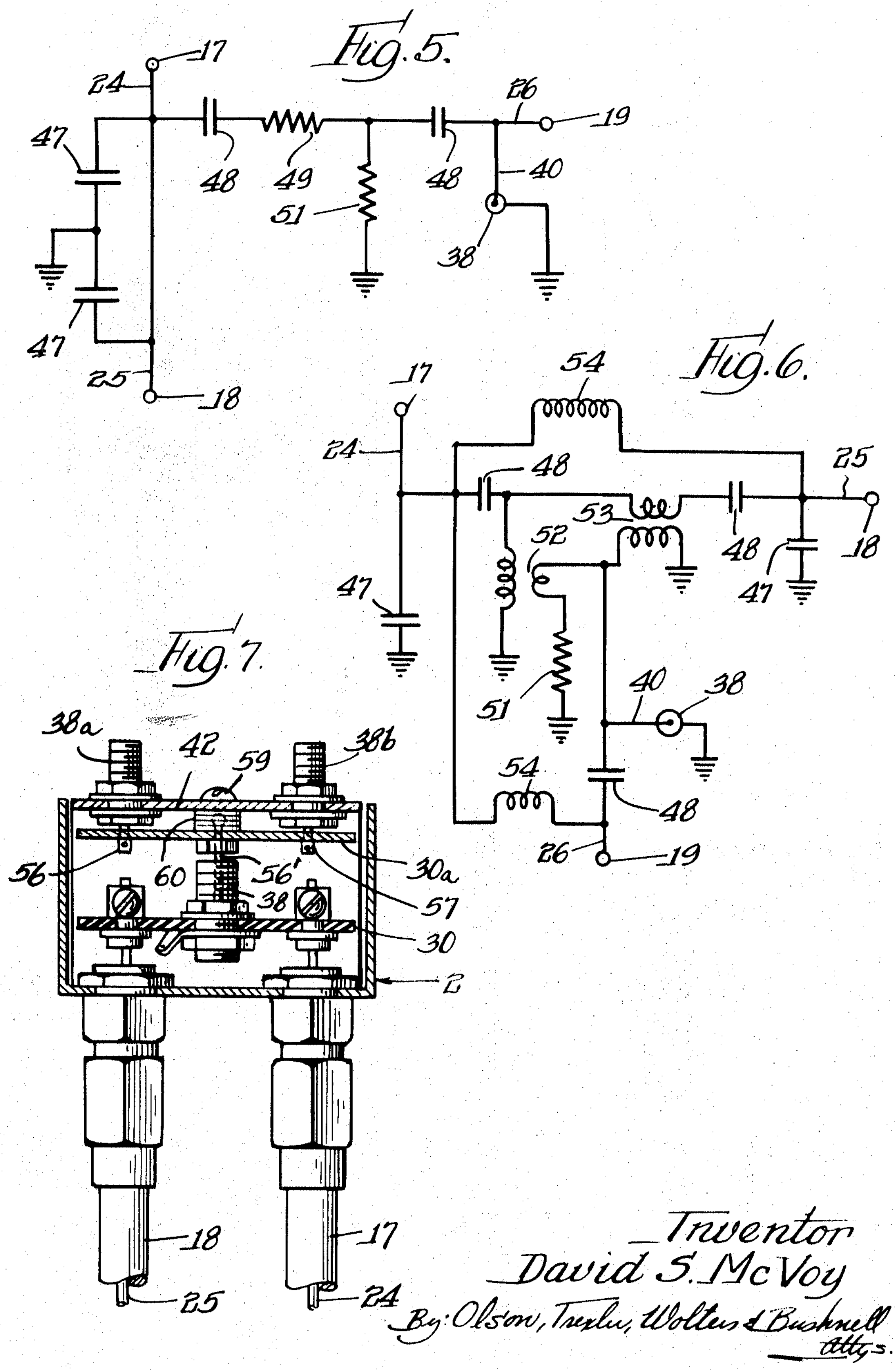
FIGS. 5 and 6 are circuit diagrams for representative types of circuits of the modules used in the present invention.
FIG. 7 is a sectional view similar to FIG. 1 and showing a tapoff in which circuit boards are stacked within the housing.

As previously stated, the circuitry on the circuit board 30 may take a variety of forms, depending upon the use to which the unit is put. In one type of circuit board, for instance a housedrop, the circuit of FIG. 5 is used. In that circuit the capacitors 48, 48 are used to block low-voltage powering signals to the tap leg 19 and housedrop connector leg 38. Capacitors 47, 47 are used to improve impedance match. Resistors 49 and 51 form a voltage-dividing network, and the value of the resistance 49 is selected to produce the desired db of isolation of the tap legs 19, 38 from the output leg 18. In another form of circuit as shown in FIG. 6, the circuit board has circuitry for a directional tap. The circuit of FIG. 6 includes two toroidal transformers 52, 53 and two RF blocking chokes 54, 54. The chokes 54, 54 permit passage of powering voltages to the output or through cable 18 and also to the tap leg cable 19. A variety of other circuits, for different functions, may be employed on circuit boards which are similar in physical construction to the circuit board 30. In any event, however, the modularized circuit board is readily capable of insertion into and removal from the housing. In a further form of the invention shown in FIG. 7, a second circuit board 30*a* is utilized in "stacked" relationship with a circuit board 30. For the sake of simplicity, the circuit components on the circuit boards 30, 30*a* are not shown. The circuit board 30*a* carries a central pin 56' plugs into the center conductor of the housedrop connector 38. On the top of the cover 42 are mounted housedrop connectors 38*a*, 38*b* having their respective center conductors 56, 57 projecting through the circuit board 30*a*. Suitable circuitry (not shown) electrically connects the center pin 56' to the center conductors 56, 57 so that the connectors 38*a*, 38*b* may each serve a housedrop cable. The circuitry is a conventional divider network. To secure the circuit board 30*a* to the cover 42 a nut-and-bolt assembly 59 may be used together with spacer washers 60.

While the principles of the present invention are herein illustrated, it will be understood that various modifications may be made without departing from the spirit and scope of the invention.

What is claimed is:

1. In a coaxial cable system, a tapoff unit comprising a housing, coaxial connectors mounted on said housing, a coaxial cable secured to each connector, each coaxial cable having an outer coaxial conductor grounded to the housing and an inner substantially parallel coaxial conductor insulated from the outer conductor and extending into the housing, a circuit board of dielectric material in said housing, said board having conductive connector sleeves in alignment with and freely receiving respectively said inner conductors, means on said sleeves for clamping said inner conductors in said sleeves, means carried by said board for providing the entire electrical coupling between said inner conductors, a grounding jack on said housing, and a grounding plug on said board and being located such that upon assembly of the board and housing by a movement of the board substantially perpendicular to said inner conductors and with the inner conductors in alignment with the respective connectors, the plug will telescope into said jack and be gripped thereby, said board upon loosening of said clamping means permitting removal and replacement thereof with a board containing other electrical circuitry but having similarly positioned sleeves and a similarly positioned grounding jack.

2. A system according to claim 1 in which said circuit board has a coaxial connector with an inner coaxial conductor connected to said circuitry and an outer coaxial conductor connected to said grounding jack.

3. A system according to claim 2 including a removable cover for said housing, and a coaxial cable connected to the connector that is on said board and projecting through said cover.

4. A tapoff unit comprising a housing, coaxial cable connectors mounted on said housing and each having means for receiving the inner coaxial conductor of a coaxial cable that is connected to the connector with the outer coaxial conductor being grounded to the housing and the inner coaxial conductor being insulated from the housing, a circuit board of dielectric material having connector means each aligned respectively with said inner conductor-receiving means for receiving the inner coaxial conductors of coaxial cables connected to said cable connectors, said connector means each including means for securing an inner coaxial conductor received thereby, circuit means carried by said board for providing the entire electrical coupling between said inner connector means, and means forming a jack-and-plug ground connection between the circuit means and the housing.

5. A tapoff unit according to claim 4 in which said circuit means includes means for passing low-frequency powering voltages from one coaxial cable to another.

6. A tapoff unit according to claim 4 including a coaxial connector on said circuit board with an inner coaxial connector connected to said circuitry and an outer coaxial connector connected to said jack-and-plug ground connection.

7. A tapoff unit according to claim 6 including an additional board of dielectric material and a cover attached thereto and including further coaxial connectors, said cover closing said housing and superimposing said additional circuit board on said first-mentioned board and with said additional circuit board having means connected to the inner coaxial connector on the first-mentioned circuit board.

* * * * *